L. GIESECKE.
MECHANICAL TOY HOOP.
APPLICATION FILED OCT. 13, 1915.
1,196,854.
Patented Sept. 5, 1916.
2 SHEETS—SHEET 1.
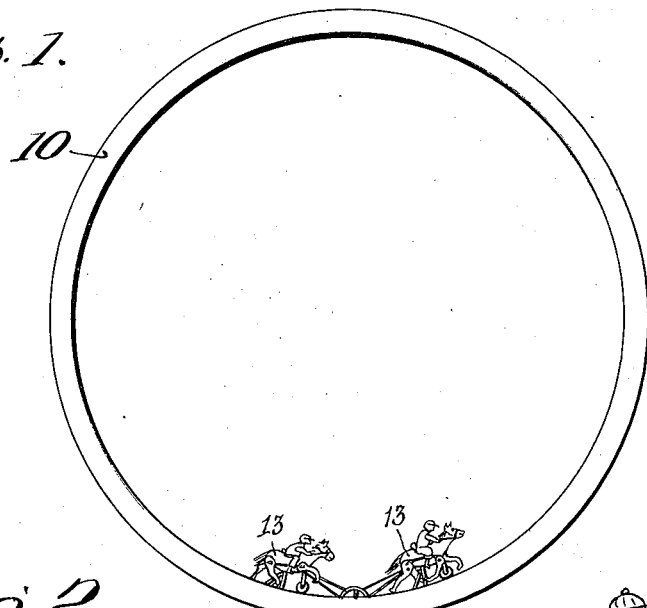
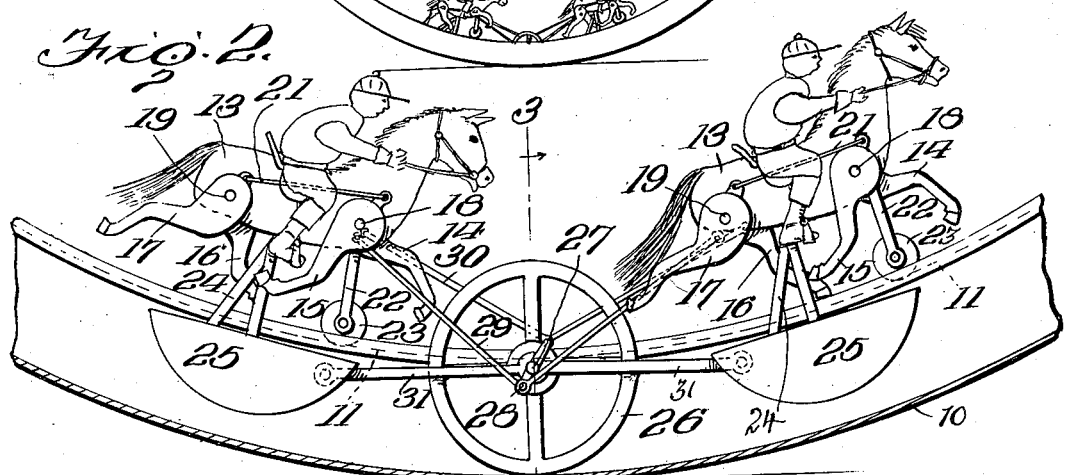
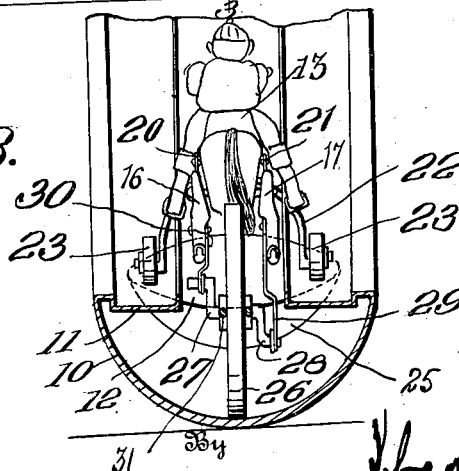
Inventor
L. Giesecke.

L. GIESECKE.
MECHANICAL TOY HOOP.
APPLICATION FILED OCT. 13, 1915.

1,196,854. Patented Sept. 5, 1916.
2 SHEETS—SHEET 2.

Inventor
L. Giesecke.

By
, Attorneys

UNITED STATES PATENT OFFICE.

LEO GIESECKE, OF SOUR LAKE, TEXAS, ASSIGNOR OF ONE-THIRD TO KURT P. GIESECKE, OF SOUR LAKE, TEXAS.

MECHANICAL TOY HOOP.

1,196,854.   Specification of Letters Patent.   Patented Sept. 5, 1916.

Application filed October 13, 1915. Serial No. 55,664.

*To all whom it may concern:*

Be it known that I, LEO GIESECKE, a citizen of the United States, residing at Sour Lake, in the county of Hardin and State of Texas, have invented certain new and useful Improvements in Mechanical Toy Hoops, of which the following is a specification.

This invention relates to improvements in toys, more particularly to the class of trundling hoops, and has for one of its objects to provide a movable figure, such as a running horse, arranged to travel on the interior of the hoop and with means arranged to impart motion to the limbs of the horse or other animal as the hoop is rotated.

With these and other objects in view, the invention consists in certain novel features of construction, as hereinafter shown and described and then specifically pointed out in the claims.

Figure 4:
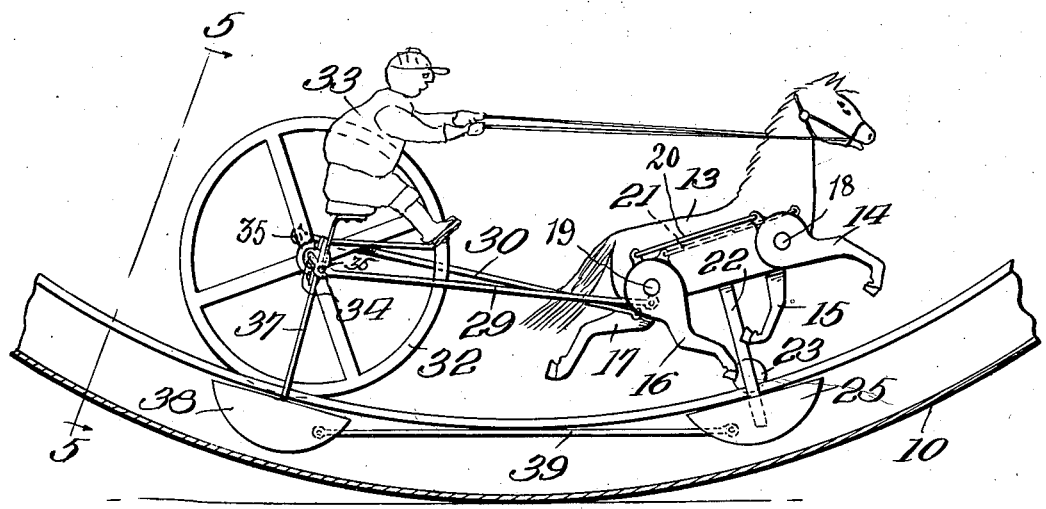
Figure 5:
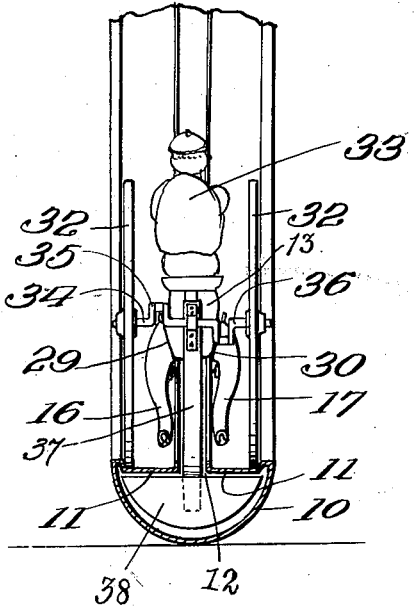

Figure 1 is a side elevation of the improved device; Fig. 2 is an enlarged sectional detail illustrating the arrangement of the figures relative to a portion of the hoop; Fig. 3 is a transverse section on the line 3—3 of Fig. 2 looking in the direction of the arrow; Fig. 4 is a view similar to Fig. 2 illustrating a modification in the construction; Fig. 5 is a transverse section on the line 5—5 of Fig. 4 looking in the direction of the arrow.

Corresponding and like parts are referred to in the following description and indicated in all the views of the drawings by the same reference characters.

The trundling hoop is represented as a whole at 10 and is formed semi-circular transversely and provided with sunken annular tracks 11, as illustrated in Figs. 3 and 5. The hoop is preferably pressed from a single strip of sheet metal, the tracks 11 being spaced apart at their confronting edges to form an annular guide-way 12. One or more figures of an animal or other object are located within the hoop, and for the purpose of illustration figures representing horses are shown, but it is to be understood that it is not desired to limit the invention to any specific species of animal or other object. The body portion of the figure is represented conventionally at 13 with movable members 14—15 representing the fore legs of the animal and movable members 16—17 representing the hind legs of the animal. The members 14—15 are pivoted at 18 to the body 13 while the members 16—17 are pivoted at 19 to the body 13, the movable members operating independently upon the pivots. The movable members 14—16 are coupled at their upper ends by a rod indicated at 20, while the movable members 15—17 are coupled at their upper ends by a rod indicated at 21. By this means the members 14—16 are caused to move in unison, while the members 15—17 are likewise caused to move in unison. A standard 22 depends from the figure and is arching in form and supports carrier wheels 23 which run constantly upon the sunken tracks 11, as illustrated in Fig. 3. Depending from the figure 13 is another standard 24 to the lower end of which a balance weight 25 is rigidly connected, the balance weight operating in the interior of the hoop and beneath the tracks 11. The standards 24 operate through the guide way 12, as will be obvious.

Arranged to travel upon the interior of the hoop and extending through the guide-way 12 is a relatively large traction wheel 26 having an axle provided with oppositely directed cranks 27—28, the cranks being preferably arranged at opposite sides of the wheel. A rod 29 is connected at one end to the crank 28 and at the other end to the movable member 15 and a similar rod 30 is connected at one end to the crank 27 and at the other end to the movable member 14. The axle of the wheel 26 is likewise connected by a bar 31 to the weight 25. In the illustration two of the figures are shown and both connected to the same crank axle of the wheel 26, but it will be obvious that one or more of the figures may thus be connected to operate simultaneously without departing from the principle of the invention or sacrificing any of its advantages. By this arrangement of parts it will be obvious that when the hoop 10 is rotated the wheel 26 will retain its position at the lower side of the hoop and hold the balance weights 25 and the figures attached thereto in the position illustrated in Figs. 1 and 2, and the rotary motion of the hoop will likewise be imparted to the wheel 26, and this motion communicated in turn to the movable members 14—15—16 and 17 and cause them to operate alternately and cause the horses to present the appearance of running around on the interior of the hoop in a natural and life-like manner.

In Fig. 4 a slight modification in the construction is shown consisting in providing two traction wheels 32 arranged to travel upon the sunken tracks 11 and mounting another figure 33 upon the axle 34 of the wheels 32. The axle 34 is provided with cranks 35—36 performing the same function as the cranks 27—28 illustrated in Fig. 2. The body 13 representing the figure of a horse is arranged in the same manner as shown in Figs. 2 and 3 with the members 16—17 representing the hind legs of the horse connected by rods 29—30 to the cranks 35—36. In the modification shown in Fig. 4 a standard 37 is shown depending from the axle 34 and carrying a balance weight 38 in the same manner as the standard 34 depends from the figure 13 in Fig. 2. The balance weight 38 is connected to the balance weight 35 of the figure 13 by a connecting bar 39, and operating in the same manner as the bar 31 in the construction shown in Fig. 2. When the hoop is rotated motion will be imparted to the wheel 32 and transmit motion to the movable members representing the legs of the animal in the same manner as shown in Fig. 2.

The improved device is simple in construction, can be inexpensively manufactured and of any required size and of any required material.

Having thus described the invention, what is claimed as new is:—

1. The combination with a hoop unobstructed interiorly, of a traction wheel rotative by said hoop, a body, supporting means for said body and movable upon the interior of the hoop, movable members carried by the body, and means whereby the motion of said traction wheel is communicated to said movable members.

2. In a trundling hoop, a figure supported by and arranged to travel upon the interior of the hook, movable members carried by the figure, a balance-weight suspended from said figure, a traction wheel having an axle and engaging said hoop and rotative thereby, connecting means between said weight and the axle of said traction wheel, and means whereby the motion of the wheel is communicated to the movable members of the figure.

3. In a trundling hoop, a figure having a carrier wheel traveling upon the interior of the hoop, movable members carried by the figure, a balance-weight suspended from said figure, a traction wheel engaging said hoop and rotative thereby, connecting means between said weight and the axle of said traction wheel, and means whereby the motion of the wheel is communicated to the movable members of the figure.

4. A trundling hoop having an annular guide-way and annular tracks, a figure having carrier wheels traveling upon said tracks, a balance-weight suspended from said figure, movable members carried by the figure, a traction wheel engaging said hoop between the guide-ways and having a cranked axle, connecting means between said weight and the axle of said wheel, and connecting means between the cranks of said axle and the movable members of the figure.

5. A trundling hoop having an annular guide-way and annular tracks, a figure having carrier wheels traveling upon said tracks, movable members carried by the figure, a traction wheel engaging said hoop between the guide-ways and having a cranked axle, and connecting means between the cranks of said axle and the movable members of the figure.

6. In a trundling hoop, a figure representing the body of an animal and arranged to travel upon the interior of the hoop, movable members representing the fore and hind legs of an animal carried by the figure, a traction wheel engaging said hoop and rotative thereby and including a cranked axle, connecting means between the cranks of said axle and the movable members representing two of the legs of the animal, and connecting means between the movable members representing the other legs of the animal.

In testimony whereof I affix my signature.

LEO GIESECKE. [L. S.]